(12) United States Patent
Helsper et al.

(10) Patent No.: US 6,876,988 B2
(45) Date of Patent: Apr. 5, 2005

(54) ENHANCED COMPUTER PERFORMANCE FORECASTING SYSTEM

(75) Inventors: David Helsper, Marietta, GA (US); Clayton Wilkinson, Alpharetta, GA (US); Robert Zack, Grayson, GA (US); John T. Tatum, Alpharetta, GA (US); Robert J. Jannarone, Atlanta, GA (US); Bernd Harzog, Alpharetta, GA (US)

(73) Assignee: Netuitive, Inc., Alpharetta, GA (US)

( * ) Notice: Subject to any disclaimer, the term of this patent is extended or adjusted under 35 U.S.C. 154(b) by 921 days.

(21) Appl. No.: 09/811,163

(22) Filed: Mar. 16, 2001

(65) Prior Publication Data

US 2002/0049687 A1 Apr. 25, 2002

Related U.S. Application Data

(60) Provisional application No. 60/242,530, filed on Oct. 23, 2000, and provisional application No. 60/250,398, filed on Nov. 29, 2000.

(51) Int. Cl.[7] .................................................. G06E 1/00
(52) U.S. Cl. ............................ 706/21; 706/25; 706/26
(58) Field of Search ............................ 706/21, 25, 26, 706/27

(56) References Cited

U.S. PATENT DOCUMENTS

| | | | |
|---|---|---|---|
| 5,491,629 A | | 2/1996 | Fox et al. |
| 5,835,902 A | | 11/1998 | Jannarone |
| 6,055,519 A | * | 4/2000 | Kennedy et al. ............... 705/80 |
| 6,216,119 B1 | * | 4/2001 | Jannarone ..................... 706/26 |
| 6,289,330 B1 | * | 9/2001 | Jannarone ..................... 706/26 |
| 6,327,677 B1 | | 12/2001 | Garg et al. |
| 6,591,255 B1 | * | 7/2003 | Tatum et al. ................... 706/25 |
| 6,631,360 B1 | * | 10/2003 | Cook ........................... 706/20 |
| 6,647,377 B2 | * | 11/2003 | Jannarone ..................... 706/16 |

FOREIGN PATENT DOCUMENTS

| | | |
|---|---|---|
| WO | WO 98/22885 | 5/1998 |
| WO | WO 00/19320 | 4/2000 |

OTHER PUBLICATIONS

Wu et al. "Combining artificial neural network and ststistic for stock market forecasting", ACM pp 257–264, 1993.*
Faerman et al, "adaptive performance prediction for distributed data intensive applications", ACM SC, pp 1–15, 1999.*
Wolters et al., "Limited area numerical weather forecasting on a massively parallel computer", ACM ICS pp 289–296, 1994.*
Swany et al., "Multivariate resources performance forecasting in the network weather service", IEEE, pp 1–10, NSF Grant ANI–0123911, 2002.*

* cited by examiner

*Primary Examiner*—Anil Khatri
(74) *Attorney, Agent, or Firm*—Michael J. Mehrman; Mehrman Law Office, P.C.

(57) ABSTRACT

A method and system for computing a performance forecast for an e-business system or other computer architecture to proactively manage the system to prevent system failure or slow response time. The system is adapted to obtain measured input values from a plurality of internal data sources and external data sources to predict a system's performance especially under unpredictable and dramatically changing traffic levels in an effort to proactively manage the system to avert system malfunction or slowdown. The performance forecasting system can include both intrinsic and extrinsic variables as predictive inputs. Intrinsic variables include measurements of the systems own performance, such as component activity levels and system response time. Extrinsic variables include other factors, such as the time and date, whether an advertising campaign is underway, and other demographic factors that may effect or coincide with increased network traffic.

25 Claims, 15 Drawing Sheets

Fig. 5

ENHANCED COMPUTER PERFORMANCE FORECASTING SYSTEM

REFERENCE TO RELATED APPLICATIONS

This patent application claims benefit of Provisional Application No. 60/242,530 filed Oct. 23, 2000 and claims priority to commonly-owned U.S. Provisional Patent Application Serial No. 60/250,398, entitled "Computer Performance Forecasting System" filed on Nov. 29, 2000.

TECHNICAL FIELD

The present invention relates to computer-based forecasting systems and, more particularly, relates to a system that forecasts the performance of a computer system or network, especially during unpredictable and dramatically changing traffic levels. For example, the performance forecasting system may be used to forecast near-term network loads, proactively manage the network in response to predicted performance degradation, and effectively illustrate the forecasts on a reporting user interface.

BACKGROUND OF THE INVENTION

While no company can be fully operational one hundred percent of the time, the success of an e-business can be significantly enhanced by obtaining a "dial-tone reliability" level at the Internet server. This refers to the level of reliability that most Americans have come to expect when they pick up their telephones. As competition among e-business vendors increases, maintaining an acceptable website response time will be crucial. For example, it has been established that e-business can lose customers if it cannot maintain an "eight-second" website response time. That is, the website should respond to a user request for access within about 8 seconds, or the customer may click and navigate somewhere else in the World Wide Web. According to Zona Research, "internet companies in the U.S. lose more than $4 billion each year from purchases that are not made because customers found web sites too slow."

The difficulty in maintaining an acceptable website response time is exacerbated during periods of unpredictable and dramatically changing traffic levels. In some cases, unusually high traffic levels can lead to outright website failure. This can be a financial disaster when the increase in traffic was the result of a successful and expensive advertising or promotional campaign undertaken by the e-business itself. For a brick and mortar business, an increased number of interested customers simply increases the length of cash-register lines. Eager customers seeing the long lines realize that the business is booming, and often decide to return later even if they are not interested enough to wait in line at that time. But in the e-business world, customers experiencing access delays get no positive feedback; they just click elsewhere and often forget about the unavailable site. To make matters worse, at present no effective way to predict a traffic-related system failure or slowdown in the near-term exists. Thus, an e-business can suffer a disastrous system failure or slowdown even though it has invested in the best network equipment, and has no reason to suspect that it is unprepared for the level of network traffic that it is about to experience.

In an attempt to address these problems, several companies have developed software applications that monitor network and component performance. The products offered by these companies are often referred to as "monitoring agents." The monitoring agents presently include Mercury Interactive, Tivoli, Desktalk Systems, Avesta Technologies, FirstSense Software, Manage.com, Keynote Systems, Pro-Active Net, Net IQ, Hewlett Packard, BMC Software, MicroMuse, Concord Software, and VitalSigns Software. The various monitoring agent programs offered by these vendors monitor activity and performance at the application, network, and system levels. These tools provide the e-business operator with real-time information regarding the performance for the system as a whole, and for discrete components within the system.

Although these products provide real-time monitoring information, they are ineffective in translating the measured performance data into accurate near-term predictions of future network performance. The unavailability of accurate near-term predictions of future network performance results in a "blind spot" that lasts from about −1 to 24 hours. In other words, no matter how current the measured performance information may be, the e-business operator still lacks an accurate estimate of its system's performance for the next business day. The resulting e-business blind spot leaves them vulnerable to unexpected system failures or slowdowns, especially when traffic levels increase rapidly.

Thus, there is a continuing need for a forecasting system that is capable of producing accurate near-term predictions of future network performance for e-business systems and system components. There is a further need for systems that are capable of automatically responding to near-term predictions of future network performance to proactively manage the system and prevent system failures and slowdowns due to increased traffic levels. Finally, there is a need to effectively display the actual and forecasted network performance.

SUMMARY OF THE INVENTION

The present invention meets the needs described above in a system that accurately forecasts the performance of a computer network or system based on learned parameters. Although the system may be used to accurately forecast the performance of any type of computer system or network, it is well suited to predicting the near-term performance of an e-business computer network or system. The computer performance forecasting system typically uses a multi-kernel, neural network computer architecture to monitor and predict multiple output variables, based on multiple input variables and a set of learned parameters, such as regression coefficients. A new forecast is generated for each successive time trial to keep pace with changing conditions. The forecasting system automatically implements a regression analysis to compute a forecast for each output variable as a function of each input variable, and automatically updates the regression coefficients for each output variable during each time trial. This allows the forecasting system to learn from the new measured data received each time trial, while it also creates a new forecast.

In an improvement over currently available monitoring agents, the performance forecasting system automatically translates the measured input data into useful near-term predictions of system and component performance. This allows the system operator to respond to a predicted system slowdown or outright failure in the near-term time frame. These responses may include allocating communication and/or processing resources to the network locations where they are needed most, changing system settings, deploying new resources, changing advertising or promotional programs, or a number of other preventative measures. Some responses may be implemented automatically, such as changing system settings, reallocating communication and processing resources, and turning off banner ads on referring sites. Other responses, such as deploying new resources and changing promotional programs, may be implemented manually. This allows an e-business operator to use a variety of techniques to proactively manage the system based on accurate near-term predictions of the system's performance.

As an added advantage the invention has over currently available monitoring agents, the performance forecasting system can include both intrinsic and extrinsic variables as predictive inputs. Intrinsic variables include measurements of the system's own performance, such as component activity levels and system response times. Extrinsic variables typically include other factors, such as the time and date, whether an advertising campaign is underway, and other demographic factors that may effect or coincide with increased network traffic. For example, network traffic on an e-business system directed to children's education may predictably increase following the dinner hour, when the weather is rainy, and during popular sporting events. Traffic on an e-business system directed to the financial industry, on the other hand, may predictably increase when the stock market is rising, and may decrease when non-financial stories dominate the news media. Research and observations may reveal many other demographic patterns that coincide with, and thus may be used to predict, increased network traffic on particular sites.

The performance forecasting system allows these extrinsic variables to be factored into the regression analysis used to predict near-term system traffic and performance levels. The system automatically learns the correlations among the input and output variables as the system gains experience in using different types of extrinsic inputs as predictive variables. This allows an e-business to utilize certain causative or predictive factors that may affect traffic into its forecasting system. For example, the operator of an e-business auction site may hypothesize that traffic on its system increases dramatically on days when the weather is bad, the financial news is bad, and a local sports team is not playing a televised game. The auction site operator can test this theory by adding variables for these factors to its near-term performance forecasting system, and then letting the system learn the covariance among these imputs and its network traffic through experience.

Finally, the invented performance forecasting system clearly and efficiently conveys the forecast information that aides an e-business in maintaining an operable website. This system uses a three-tier approach in notifying an e-business of potential problems with increasing levels of specificity. After generating an alarm, the invented system can notify the e-business of the potential problem via electronic mail. In response, employees of the e-business can assess the status of the system components or computer architecture by reviewing a dashboard user interface. Reviewing the dashboard provides additional specificity by identifying the data sources operating outside normal operating limits. For more information, employees can review the invented system's reporting user interface. This interface clearly displays in a single location performance history, alarms, and the comparison of actual performance to normal operating limits. Armed with the displayed information, the e-business can respond appropriately and minimize system failure.

Generally described, the invention provides a performance forecasting system for a computer system. For each of a plurality of successive time intervals, the forecasting system obtains measured input values correlated to activity associated with the components of a computer system. The forecasting system then retrieves learned parameters and computes the near-term performance forecast based on the measured input values and the learned parameters. The forecasting system also automatically updates the learned parameters based on the measured input values, and may also determine a tolerance band for the performance of the computer system for a plurality of time intervals, such as near-term time intervals. The system may then activate alarm conditions if the performance forecast for the computer system falls outside the tolerance band.

The forecasting system typically obtains the measured input values by communicating with one or more computer system monitoring agents to obtain the measured input values. For example, one of the monitoring agents may "ping" the computer system to obtain a measured response time. To aid the user, the forecasting system typically displays indicators representative of the measured input values, the components of the computer system, and the performance forecast for the computer system. The measured input values may include a first measured input value representative of response time at a web server, a second measured input value representative of response time at an applications server; and a third measured input value representative of response time at a database server. In this case, the components indicators may represent the response time at the web server, the response time at the application server, and the response time at the database server, and the network latency.

The input values may also represent data sources external to the computer system or external to the computer system. For example, the external input values may represent demographic factors, such as the time, date, season, advertising scheduling, methodology of advertising; telephone traffic; day, week, year, holiday, weather, news, sports events, and television programming.

The performance forecasting system may also take one or more response actions, such as activating an alarm condition, imputing a missing or deviant input value, reallocating communication resources, reallocating processing resources, changing system configuration settings, discontinuing non-critical system functions, restarting a hung application program, and changing an advertising program. The forecasting system may automatically implement one or more of these actions in response to a forecasted system slowdown or failure.

The learned parameters typically include connection weights defining elements of an inverse covariance matrix. The forecasting system may update the learned parameters by automatically updating the connection weights in a covariance matrix corresponding to the inverse covariance matrix, and inverting the updated covariance matrix. Alternatively, the forecasting system may update the learned parameters by automatically updating the connection weights of the inverted covariance matrix.

In a typical configuration, the performance forecasting system includes an error detection and correction module that receives input values for a current time interval, detects deviant or missing data values among the measured input values, and imputes replacement data values to replace the deviant or missing data values. The forecasting system also includes a concurrent-learning information processor that receives the error-corrected input data vector for the current time interval, retrieves a set of learned parameters representing observed relationships among the measured input values and a set of output values, computes the set of output values based on the error-corrected input data vector and the learned parameters, and updates the learned parameters based on the measured input values for the current time interval. The forecasting system also includes a reporting user interface that computes a performance forecast for the computer system based on computing the set of output values for the current time interval, compares the performance forecast to a tolerance band, and takes one or more response actions in response to the near-term performance forecast.

The specific techniques and structures employed by the invention to improve over the drawbacks of prior network management tools and accomplish the advantages described above will become apparent from the following detailed description of the embodiments of the invention and the appended drawings and claims.

BRIEF DESCRIPTION OF DRAWINGS

The file of this patent contains at least one drawing executed in color. Copies of this patent with color drawing(s) will be provided by the Patent and Trademark Office upon request and payment of the necessary fee.

FIG. 5 is a secondary, browser-based screen viewed by activating a portion of the screen of FIG. 4A that identifies system alarms.

DETAILED DESCRIPTION OF THE EMBODIMENTS

Figure 1:
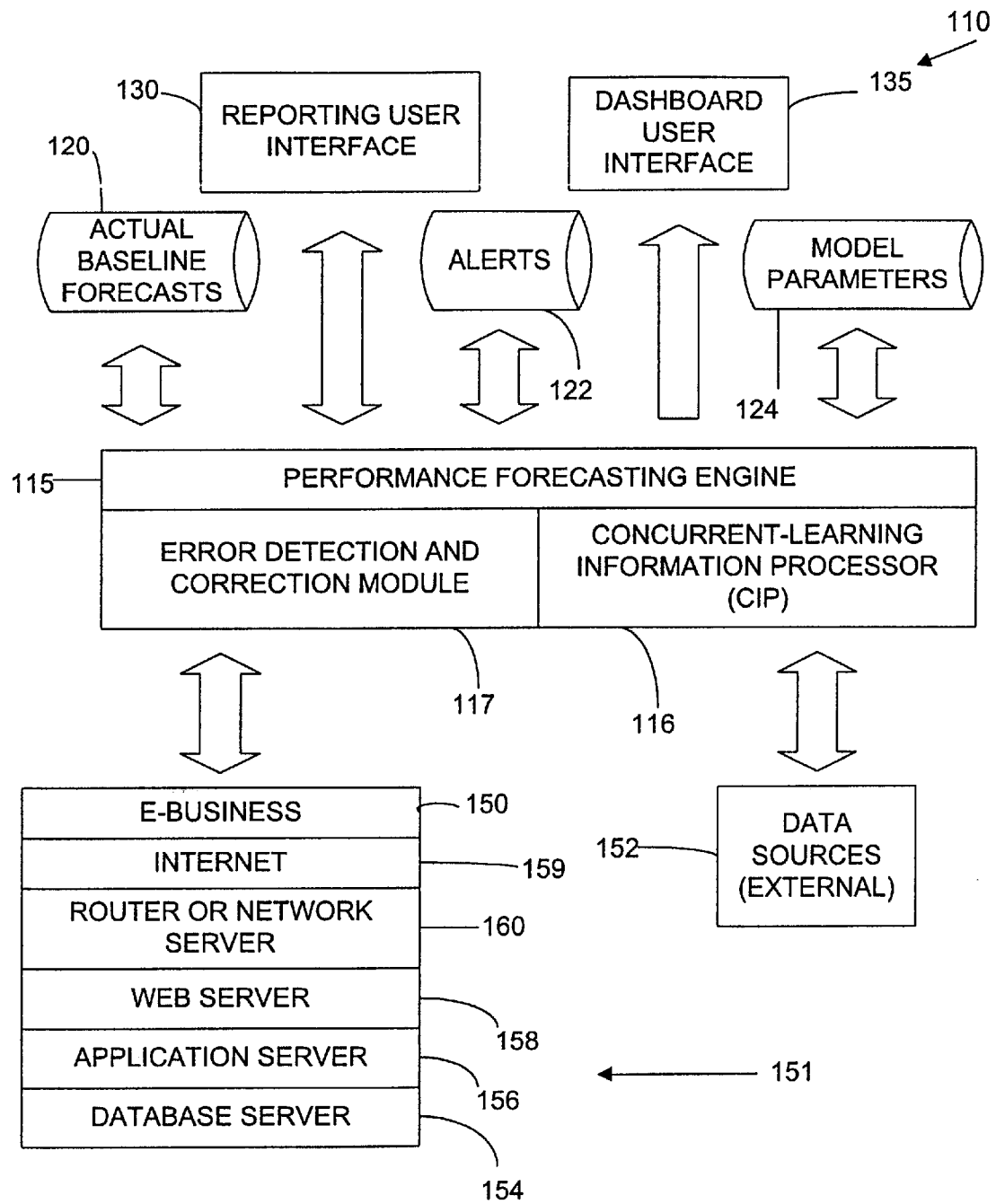
FIG. 1 is a functional block diagram illustrating an e-business near-term performance forecasting system.

The invention may be embodied in a near-term computer performance forecasting system that uses a multi-kernel, neural network computer architecture to monitor and predict multiple output variables based on multiple input variables. The details of the forecasting system architecture are described in commonly owned U.S. Pat. No. 5,835,902 and Ser. No. 09/137,265 entitled "Concurrent Learning And Performance Information Processing System"; commonly owned U.S. patent application Ser. No. 08/974,377 entitled "Multi-Kernel Neural Network Concurrent Learning, Monitoring, And Forecasting System"; and commonly owned U.S. patent application Ser. No. 09/543,697 entitled "Automatic Data Extraction, Error Correction And Forecasting System," each of which is incorporated into this specification by reference.

The computer performance forecasting system of the present invention may be embodied in a computer system and business process that provides forecasts as a subscription service, or it may be a dedicated system. The computer performance forecasting system is well suited to producing near-term forecasts in real time. Nevertheless, the system may operate on a longer prediction-learning cycle. For example, the system may be configured to predict the computer system performance based on previously learned parameters during the course of a business day, and then update the learned parameters at the end of the day or at night. Similarly, the performance forecasts may be near-term, such as one day, or they may be for a longer horizon, such as several days, weeks, months or longer.

As used in this specification, the term "performance forecast" includes computed estimates of the computer system's performance for a current time interval as well as for future time periods. That is, the "performance forecast" prepared during a current time interval may include a computed estimate for the current time interval. Producing this computed estimate for the current time interval is sometimes referred to as the "monitoring." On the other hand, producing a computed estimate for future time interval is sometimes referred to as the "prediction." To reiterate the previous point using these terms, the term "performance forecast" includes both monitoring and prediction.

In addition, the process of replacing missing or deviant input values based on a monitoring forecast (i.e., a computed estimate for the current time interval) is sometimes referred to as "imputing." Imputing is a type of response action that the monitoring and forecasting system may implement in response to an evaluation of received input values. The system may also implement response actions in response to predicted output values. In other words, "response actions" may include imputing missing or deviant values for the current time period as well as taking other actions in response to the monitored values and/or the predicted values.

The computer performance forecasting system is particularly useful for e-businesses that rely on computer system and network availability for commercial transactions. Nevertheless, the computer performance forecasting system may be generally applicable to a wide variety of computer systems and, as such, is not limited to e-business applications. For example, the system could be used to predict and proactively manage computer systems for processing financial transactions, performing scientific calculations, searching databases, performing character or image recognition, manipulating video data, and so forth.

Generally, the multi-kernel neural network computing architecture is configured to learn observed relationships or correlations among feature values as the network monitors and imputes measured input values and also forecasts future output values. This computing architecture, referred to as a concurrent-learning information processor (CIP), includes a multi-kernel neural network array with the capability to learn and predict simultaneously. The CIP also includes a manager and an input-output transducer that may be used for input-output refinement. These components allow the computing capacity of the multi-kernel array to be reassigned in response to measured performance or other factors. The output feature values computed by the multi-kernel array and processed by an output processor of the transducer are supplied to a response unit that may be configured to perform a variety of monitoring, forecasting, and control operations in response to the computed output values. Important characteristics of the CIP, such as feature function specifications, connection specifications, learning weight schedules, and the like may be set by a technician through a graphical user interface.

The multi-kernel array learns and predicts simultaneously in "real time" in that each kernel of the array performs a predicting-learning cycle for each time trial. The ability of the CIP to learn and predict simultaneously in real time represents a significant advancement in data analysis techniques. The ability of the manager, along with the input-output transducer, to redefine the input-output relationships of the multi-kernel array from time to time represents another significant advancement. The multi-kernel array may be organized into various types of sub-arrays to tailor the CIP to various types of physical applications. The multi-kernel array typically includes at least one monitoring sub-array and at least one forecasting sub-array. The monitoring sub-array imputes input and output feature values for the current time trial. These imputed feature values are used to compute deviance values for the current time trial and to supply imputed feature values for missing or out-of-tolerance measured input values, if necessary. The forecasting sub-array predicts output feature values for future time trials.

The operating cycle for each time trial in a multi-kernel array including a monitoring sub-array and a forecasting sub-array is imputation prediction (predicting in the monitoring sub-array), forecast learning (learning in the forecasting sub-array), forecast prediction (predicting in the forecasting sub-array), and imputation learning (learning in the monitoring sub-array). This sequence allows the monitoring sub-array to perform its imputing function for the current time trial before learning, and then allows the forecasting sub-array to learn from the current time trial before predicting. Learning in the monitoring sub-array is delayed until after the forecasting sub-array has completed its cycle to speed the availability of the predicted output values.

Monitoring and forecasting kernels may be grouped into sub-arrays to tailor the CIP to various physical applications. For example, the organization of the multi-kernel array may correspond to a spatial configuration of inputs and outputs, a temporal configuration of inputs and outputs, or a combined spatial and temporal configuration of inputs and outputs. As specific examples, a spatial configuration may be tailored to an image processing application, a temporal configuration may be tailored to a commodity price forecasting application, or a combined spatial and temporal configuration may be tailored to an energy demand forecasting application.

The CIP may be embodied in dedicated-hardware computing equipment or in software that runs on conventional sequential processing computing equipment. The dedicated hardware embodiments are best suited to applications that require very fast processing, whereas the software embodiments are best suited to applications that will tolerate significantly lower processing rates. In general, the software embodiments may be significantly less expensive to implement because they will run on off-the-shelf computer equipment. The hardware embodiments, on the other hand, require specially-made dedicated-hardware computing equipment. Because the CIP structure includes a manager and transducer that permit reconfiguration of input-output relationships, however, a single hardware embodiment may be configured to perform a wide range of different tasks. For this reason, both the software and the hardware embodiments may be used as multi-purpose, and in many respects general-purpose, processors.

The software embodiments are preferably configured in an object-oriented architecture in which the discrete components of the CIP are programmed in discrete objects. Each object includes a predefined interface that defines a protocol for communicating and exchanging data with the object. By configuring the software embodiment in discrete objects, each object may have a corresponding discrete physical element or group of elements in a hardware analog. This relationship between the software and hardware embodiments facilitates developing and testing models in software and, once perfected, mass producing hardware embodiments. Nevertheless, it should be understood that the invention could be embodied in other types of object-oriented architectures and could use software techniques other than object-oriented programming.

The major components of the CIP are an input-output transducer, a multi-kernel neural network array, a manager, a response unit, and a user interface. The processing sequence for a particular time trial begins when the transducer receives measured input values. The transducer includes an input processor that transforms the measured input values into input feature values in accordance with input feature specifications supplied by the manager. The multi-kernel array computes output feature values based on the input feature values, connection specifications supplied by the manager, and regression coefficients that are stored in a learned parameter memory. The output feature values are returned to the transducer, which includes an output processor that transforms the output feature values into computed output values in accordance with output feature specifications supplied by the manager. The computed output values are then transmitted to a response unit that may perform a variety of monitoring, forecasting, and control operations in response to the output values.

Each kernel of the multi-kernel array performs predicting operations and learning operations for each time trial. The array typically includes one or more monitoring kernels, referred to as a monitoring sub-array, and one or more forecasting kernels, referred to as a forecasting sub-array. The monitoring sub-array imputes input feature values and computes deviance values based on the imputed input feature values. Imputation, in this sense, means predicting the input feature values based on historical data stored in a recent feature memory. The deviance values are then computed as the difference between the imputed input feature values and the input feature values based on the measured input values for the current time trial. The deviance values are compared to tolerance values to trigger deviance operations, such as indicating an alarm condition or using an imputed feature value rather than a measured feature value in subsequent computations. Using imputed feature values in subsequent computations is particularly useful when measured input values are missing or corrupted.

The forecasting sub-array predicts output feature values for future time trials. Because the forecasting sub-array is concerned only with future time trials, it may be configured to learn from the input data for the current time trial before predicting output data for future time trials. The monitoring sub-array, on the other hand, first predicts by imputing values for the current time trial and then learns from the input data for the current time trial. Therefore, the operating cycle for each time trial processes is imputation prediction (predicting in the monitoring sub-array), forecast learning (learning in the forecasting sub-array), forecast prediction (predicting in the forecasting sub-array), and imputation learning (learning in the monitoring sub-array). This sequence allows the monitoring sub-array to perform its imputing function for the current time trial before learning, and then allows the forecasting sub-array to learn from the current time trial before performing its predicting function. Learning for the monitoring sub-array is delayed until after the forecasting sub-array has completed its cycle to speed the availability of the output values.

The CIP repeats the preceding operating cycle in a steady-state mode for multiple time trials until refinement operations are indicated. Many thousand operating cycles are typically repeated between refinement operations. During refinement operations, the manager may reconfigure the CIP in many ways, often in response to parameters and other instructions received through the user interface. Specifically, the manager may output descriptive statistics, delete ineffective feature values, combine redundant feature values, specify new feature values, redefine connection specifications for the multi-kernel array, redefine input feature specifications for the transducer input processor, redefine output feature specifications for the transducer output processor, redefine learning weight specifications for updating the connection weights, reconfigure the transducer functionality, and reassign the computing capacity of the multi-kernel array. The refinement operations give the CIP the ability to reconfigure itself in response to measured performance, user instructions, and other factors.

Referring now to the drawings, in which like numerals refer to similar elements throughout the several figures, FIG. 1 is a functional block diagram illustrating a near-term performance forecasting system 110. This system includes a performance forecasting engine 115 and an error detection and correction module 117. The concurrent-learning information processor (CIP) 116 includes a multi-kernel neural network array with the capability to learn and predict simultaneously, as described in detail in U.S. patent application Ser. No. 08/974,377 entitled "Multi-Kernel Neural Network Concurrent Learning, Monitoring, And Forecasting System." The CIP 116 includes various databases that define feature function specifications, connection specifications, learning weights schedules, and the like that may be set by a technician through a graphical user interface 130. The multi-kernel array learns and predicts simultaneously in real time in that each kernel of the array performs a predicting-learning cycle for each time trial or current time interval.

The error correction and detection capability of the error detection and correction module 117 of the present invention have been described in U.S. patent application Ser. No. 09/543,697 entitled "Automatic Data Extraction, Error Correction And Forecasting System." In certain embodiments, the error correction and detection capability allows the system 110 to detect deviant or missing data values among the measured input values, and imputes replacement data values to replace the deviant or missing data values. For example, the system may identify input data fields with missing or corrupted data, and replace these data fields with imputed data representing an estimate of the missing or corrupted data based on the data received during previous time trials and the valid data received during the current time trial.

The performance forecasting system 110 further includes a database 120 of actual, baseline and forecasted performance data, and a database 122 of alarm conditions and associated system alerts and database 124 of computer system model parameters characteristic of an e-business or other computer system or computer network. The e-business performance forecasting system 110 also includes a reporting user interface 130 and a dashboard-type graphical user interface 135.

The internal data sources 151 typically include a database server 154, an applications server 156, a web server 158, and network server or router 160 or other simple network management protocol (SNMP) compatible device. When determining the performance of the e-business system 150, various model parameters that reflect the performance of the e-business system 150 are stored in a model parameter database 124. For example, the measured input values may include a value representative of a web order rate or call center traffic; a value representative of a website response time, a value representative of an application response time; a value representative of a database response time, and a value representative of network latency. Additionally, a measured input value may include a value representative of a pinging response time through the Internet 159 or broadband network.

Figure 2:
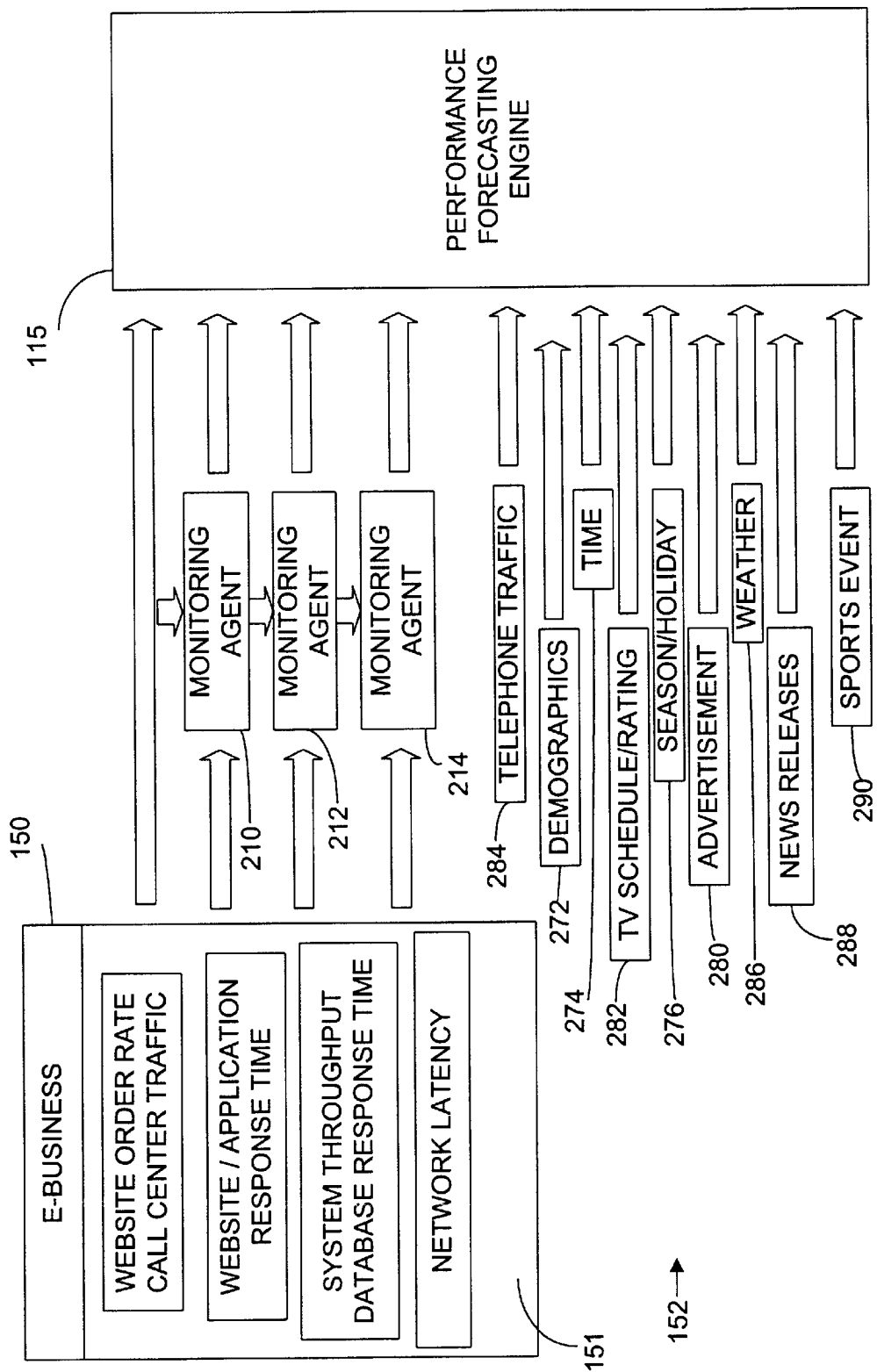
FIG. 2 is a functional block diagram illustrating the performance forecasting engine, internal data sources, and external data sources.

The database server 154, the applications server 156, the web server 158, and the network server or router 160 are typically monitored by one or more monitoring agents, as illustrated on FIG. 2. For example, the website or application response time may be monitored by the agent supplied by Mercury Interactive Corporation, the system throughput and/or database response time may be monitored by the agent supplied by Tivoli, and the network latency may be monitored by the agent supplied by Desktalk Systems, Inc.

In general, the e-business performance forecasting system 110 communicates with one or more of the monitoring agents to receive measured input values representing the real-time performance of the components of the computer system. In many instances, various monitoring agents are capable of communicating with each other to pass on various operational parameters or performance factors. For example, the application of a monitoring agent 210 may pass on the website response time to the application of a monitoring agent 212, and the application of a monitoring agent 212 may pass on the system throughput, database response time, and/or other performance factor to a monitoring agent 214, and so forth. In this case, the performance forecasting system 110 may not need to communicate with each monitoring agent individually.

FIG. 2 is a functional block diagram illustrating the performance forecasting engine 115, internal data sources 151, and external data sources 152. Examples of external data sources 152 include information or statistics (external measured input values) related to demographics 272, time 274, seasons/holidays 276, advertisement 280, television scheduling and ratings 282, telephone network traffic 284, weather 286, news 288, sports events 290, etc. In general, the external data sources 152 allow the performance-forecasting engine 115 to learn covariance relationships that may exist between these external factors and the performance of e-business computer systems, and then use the data values representing the external factors to predict the performance of the computer system. The particular external factors shown in FIG. 2 are intended to illustrate the types of the external factors that may be considered. Those skilled in the art may identify other external factors that may be useful for predicting the performance of e-business computer systems.

For example, network traffic on an e-business system directed to children's education may predictably increase following the dinner hour, when the weather is rainy, and during popular sporting events. Traffic on an e-business system directed to the financial industry, on the other hand, may predictably increase when the stock market is rising, and may decrease when non-financial stories dominate the news media. Research and observations may reveal many other demographic patterns that coincide with, and thus may be used to predict, increased network traffic on particular sites.

The near-term performance forecasting system 110 allows these extrinsic variables 152 to be factored into the regression analysis used to predict near-term system traffic and performance levels. The system automatically learns the covariance among the input and output variables as the system gains experience in using different types of extrinsic inputs as predictive variables. This allows an e-business to theorize about certain causative or predictive factors that may affect traffic on its system, and then build these factors into its forecasting system. For example, the operator of an e-business auction site may hypothesize that traffic on its system increases dramatically on days when the weather is bad, the financial news is bad, and a local sports team is not playing a televised game. The auction site operator can test this theory by adding variables for these factors to its near-term performance forecasting system, and then letting the system learn the covariance among these inputs and its network traffic through experience during holiday's such as mother' day telephone traffic is high.

Similarly, the e-business operator may be able to change advertising or pricing patterns in response to increased network traffic. For example, promotional discount programs or banner advertisements may be automatically turned off or altered in response to near-term predictions of high network traffic. This may allow preemptive measures to be identified early and corrective actions taken to maintain normal operating conditions. The added evaluation of external influences in the forecasted performance would complement managing of the unpredictable and dramatically changing traffic levels.

Figure 3A:
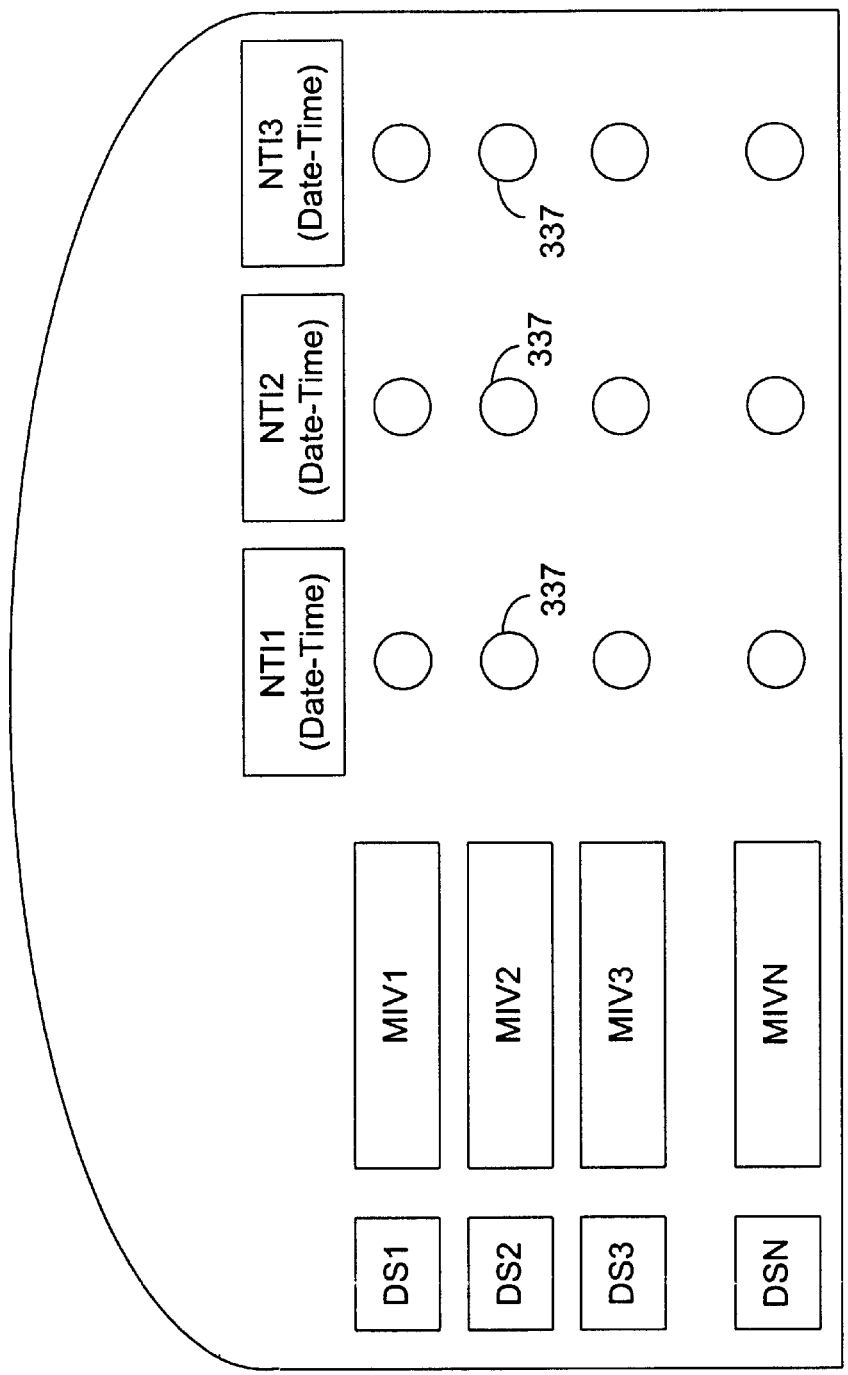
FIG. 3A is a functional block diagram of a dashboard user interface.

FIG. 3A illustrates a dashboard-type user interface 135 for displaying monitoring and control data associated with the forecasting system 110. The dashboard 135 includes a display panel having a number of internal data source identifiers DS1, DS2, DS3, and DSN identifying the system components or computer architecture. In the exemplary embodiment, DS1 includes an identifier representing the network server 160; DS2 includes an identifier representing the web server 158; DS3 includes an identifier representing the application server 156; and DSN includes an identifier representing the database server 154. The display panel of the dashboard 135 further includes a number of measured input values MIV1, MIV2, MIV3 and MIVN each of which is associated with a respective one of the internal data source identifiers DS1, DS2, DS3, and DSN. In the exemplary embodiment, MIV1 includes an identifier representing the available memory; MIV2 includes an identifier representing the response time; MIV3 includes an identifier representing the throughput; and MIVN includes an identifier representing the query response.

The display panel of dashboard 135 also includes a number of status light indicators 337. In the exemplary embodiment, the light indicators 337 are adapted to emit either green, yellow, or red. A green color is representative of status conditions that are within the prescribed or normal operating limits, a yellow color is representative of a status condition predicted to be outside of normal operating limits, and a red color is representative of a status condition that is outside of the prescribed or normal operating limits and is an indication of an alarm condition. The status light indicators 337 include a row of light indicators for each of the plurality of measured input values MIV1, MIV2, MIV3 and MIVN. These indicators typically identify an impending status condition for each measured input value at a plurality of near-term future time points, and thus provide a quick snapshot of the monitored computer network's impending performance. Of course, other types of graphical indicators and color schemes may be used to represent the variables that are monitored and forecasted by the system 110.

Figure 3B:
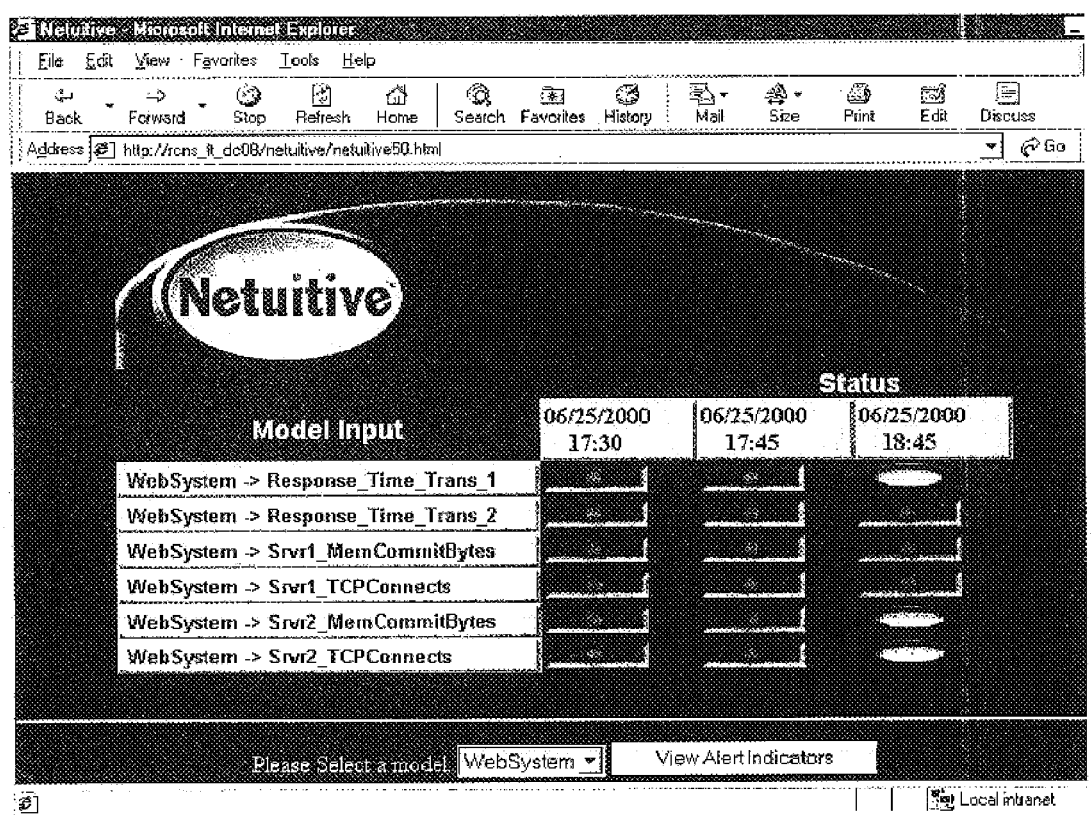
FIG. 3B is a pictorial representation of the dashboard interface of FIG. 3A.

In the embodiment shown in FIG. 3A, there are three status light indicators 337 in each row, each of which is representative of a near-term forecast interval NTI1, NTI2, and NTI3. NTI1 includes an identifier representative of the current date, such as Jun. 1, 2000, and a near-term forecast interval, such as 10:05:22. NTI2 includes an identifier representative of the current date, such as Jun. 1, 2000, and a near-term forecast interval 11:00:26. NTI3 includes an identifier representative of the current date, such as Jun. 1, 2000, and a near-term forecast interval 17:00:00. FIG. 3B is a pictorial representation of the dashboard interface 135. In this figure, NTI3 is shown as 18:45 with an associated date of Jun. 25, 2000. For this interval, the three "green" lights indicate status conditions within prescribed normal operating limits. In contrast, the three yellow lights indicate predictions outside of prescribed normal operating limits. Moreover, the increased dimensions of the "yellow" lights visually attract greater attention from the user. Consequently, a user can pay closer attention to the irregular system performance.

Once an alarm is detected, the forecasting system 110 may send an e-mail alert and/or a simple network management protocol (SNMP) trap to the appropriate system managers/operators of the e-business system 150 to take preemptive measures to avoid system failure or delays in excess of eight (8) seconds. In the preferred embodiment, the e-business performance forecasting system 110 typically identifies those components or subsystems of the e-business infrastructure that are predicted to experience slowdown or failure due to high traffic rates. The communications by the e-business performance forecasting system 110 to the e-business system 150 may be via the Internet, a broadband network, or an intranet.

Typically, an e-business system 150 has redundant Internet network connectivity so that if one Internet service provider (ISP) is experiencing network failures or excess network traffic, an alternate ISP or and alternate network device within the same ISP may be used. Hence, the e-business performance forecasting system 110 would forecast the e-business's performance taking into account ISP failures to provide the customer with a high level of connection reliability. That is, the forecasting system 110 may select an alternate ISP or an alternate ISP network device in response to a detected or forecasted slowdown or failure of an ISP network device.

Figure 4A:
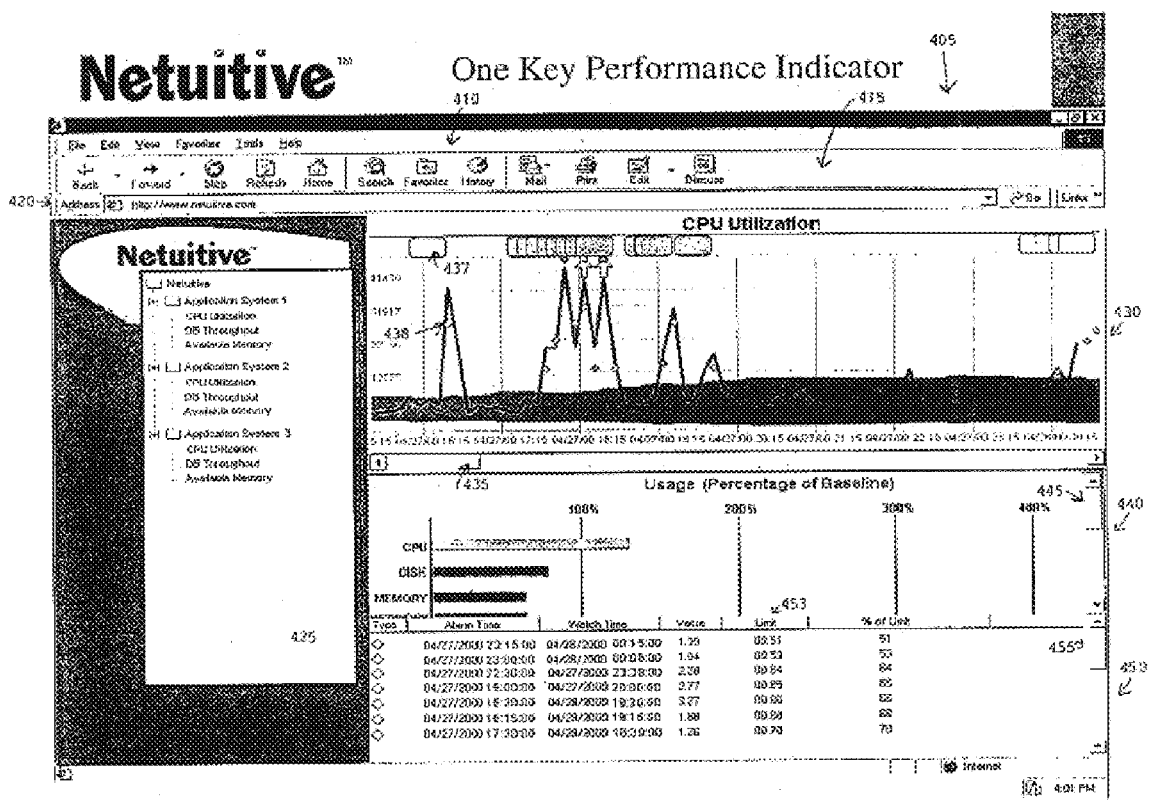
FIG. 4A is a multi-window, browser-based screen generated by the reporting user interface of FIG. 1 that illustrates the actual and predicted network performance.

FIG. 4A is a multi-window, browser-based screen 405 generated by the reporting user interface 130 that illustrates the actual and predicted performance of the system 110. While the screen 405 illustrates three windows, numerous alternative embodiments could result from using a screen with one window, two windows, four windows, or so forth. The screen 405 includes a main toolbar 410 with various legends such as "File", "Edit," "View," "Favorites," "Tools," and "Help." In the preferred embodiment, the main toolbar 410 provides for navigation and selectivity via drop-down menu lists through the application, which is well known in the art. The browser-based screen 405 further includes a secondary toolbar 415 having the legends "Back," "Forward," "Stop," "Refresh," "Home," "Search," "Favorites," "History," "Mail," "Print," "Edit," and "Discuss." In the exemplary embodiment, the legends are displayed in combination with associated icons representative of such legends. The browser-based screen 405 also includes a third toolbar 420 having the legend "Address" and a selection box where an Internet address may be entered. Typically, the secondary toolbar 415 and third toolbar 420 aid a user in browsing the Internet.

The screen 405 also includes multiple windows that illustrate various aspects of the computer system's performance for an e-business 150. A control window 425 provides hierarchical viewing of all of a user's application systems and subsystems. For example, Application System 1 may refer to resources that support a business' billing system. In contrast, Application System 2 may refer to resources that support on-line banking.

Figure 5:
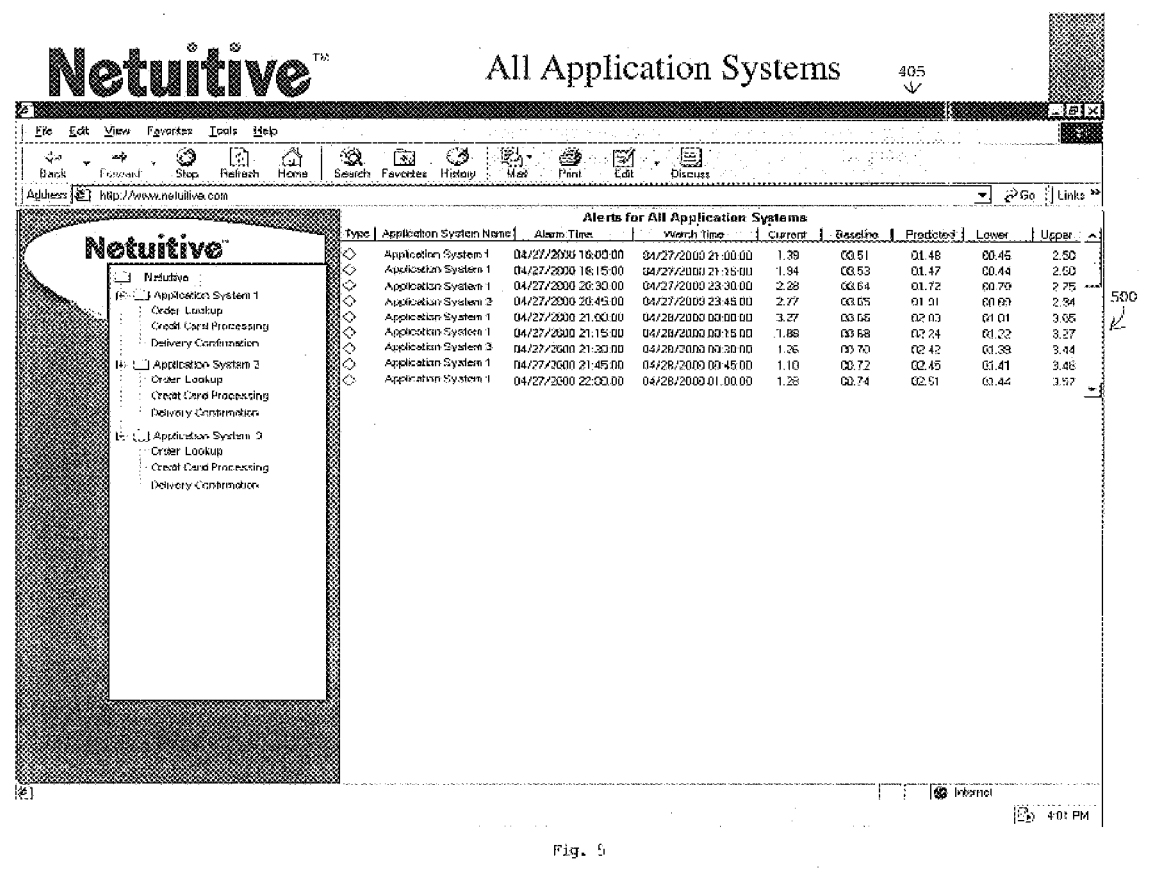
Figure 6:
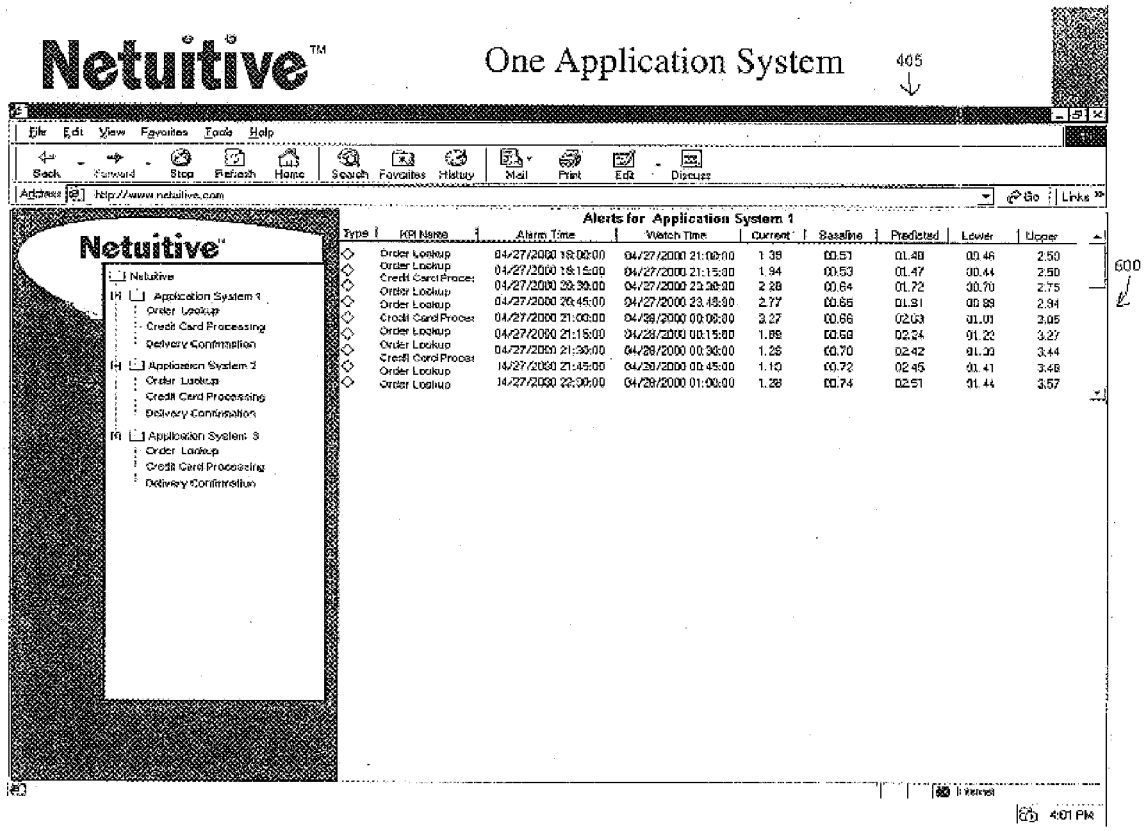
FIG. 6 is a secondary, browser-based screen that identifies alarms for an application system.

As a user selects an item in the control window 425, the content of the screen 405 changes. For example, selecting the folder labeled "Netuitive" causes the screen 405 to display an alarm window 500 that identifies the most recent one hundred Netuitive system alarms. FIG. 5 illustrates this window. In contrast, selecting the folder labeled Application System 1 causes the screen 405 to display an alarm window 600 that identifies only the alarms for that application system. FIG. 6 illustrates the window 600. The reporting user interface 130 associates at least one key performance indicator (KPI) with each application system that serves as the criteria for predicting performance of that application system. The control window 425 includes key performance indicators labeled "CPU Utilization," "DB Throughput," and "Available Memory. However, other key performance indicators may also be included.

Selecting one of the key performance indicators causes the screen 405 to display a KPI window 430, an underlying indicator window 440, and an alarm window 450. A KPI window 430 identifies a graphical representation of the "Actual" performance (black) of an e-business system based on measured input values for the selected KPI. The KPI window 430 also includes a scroll bar 435 that enables scrolling of the graphical representation to other time instances. For example, a user may view previous performance by moving the scroll bar 435 to the left.

Within the KPI window 430, the "Baseline" tolerance range (green) identifies the e-business' performance capability. The diamonds (red) identify the forecasted performance outside of the "Baseline" based on the measured input values for a current time trial. These values are updated for subsequent time trials. The red bars represent the window in which the predictive alarms were issued. Typically, the reporting user interface 130 issues a predictive alarm before the predicted performance lies outside of the "Baseline." Graphically, the KPI window 430 illustrates this by placing the beginning of the bar at the time representing the issuance of a predictive alarm and end of the bar at the time representing the occurrence of the problem. For example, the bar 437 may begin one hour before appearance of the diamond 438 representing the forecasted performance outside the "Baseline." Using the KPI window 430, a user may quickly assess when an alarm issued, the predicted performance and the actual performance relative to the "Baseline."

The underlying indicator window 440 illustrates the percentage of the "Baseline" that underlying indicators utilize in a given instance. Underlying indicators serve as criteria that impact the related KPI. They may include system components such as "CPU," "Disk," and "Memory." In addition, the underlying indicators may include indicators such as temperature that are not system components. The underlying indicator window 440 also includes a vertical scrollbar 445 that enables viewing of all underlying indicators by scrolling. Using the underlying indicator window 440 with the KPI window 430 can illustrate the underlying indicator partially responsible for a given alarm. For example, system component responsible for the alarm 437 may be the "CPU."

Figure 7:
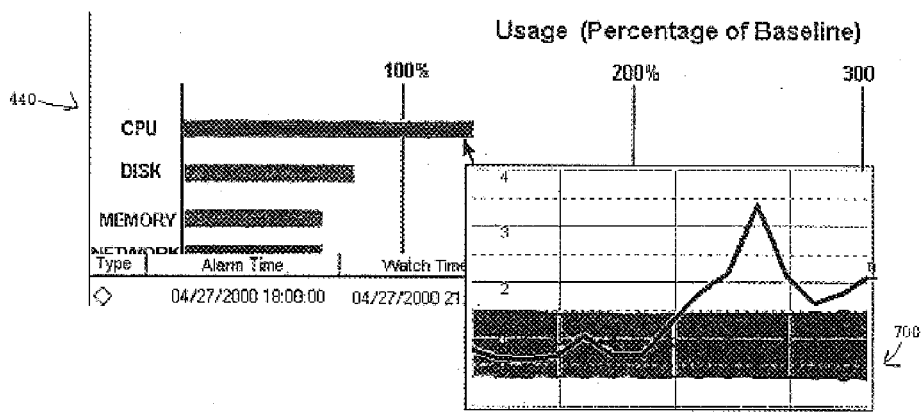
FIG. 7 is a browser-based, pop-up window that graphically illustrates the status of one of the underlying indicators of FIG. 4A.

To further pinpoint the possible source of a given alarm, the reporting user interface 130 may include a "pop-up" window feature as illustrated in FIG. 7. The window 700 may appear as a user moves a pointing device, such as a mouse, over a portion of the underlying indicator window 440. Alternatively, double-clicking on a portion of the underlying indicator window 440 could generate the "pop-up" window 700. This window illustrates the variation of an underlying indicator with time. In a preferred embodiment, the time range in the pop-up window 700 may be the same as the time range of the KPI window 430. Consequently, a user may determine if the CPU spiked during the same time period that a KPI spiked. If so, the irregular behavior of the CPU may indicate that it caused the KPI spike.

The alarm window 450 lists current and previous alarms for the KPI selected in the control window 425. The alarm window 450 includes a toolbar 453 having column labels "Type," "Alarm Time," "Watch Time," "Value," "Limit," and "% of Limit." Alarm Time indicates when the reporting user interface 130 sent a predictive alarm. In contrast, the Watch Time indicates when the expected problem should occur. The Limit may indicate the value of the Baseline. This window also includes a scroll bar 455 that enables viewing of all of the KPI alarms. Using these labels, the user reporting interface module 130 may provide additional information regarding the nature of the alarms.

Figure 4B:
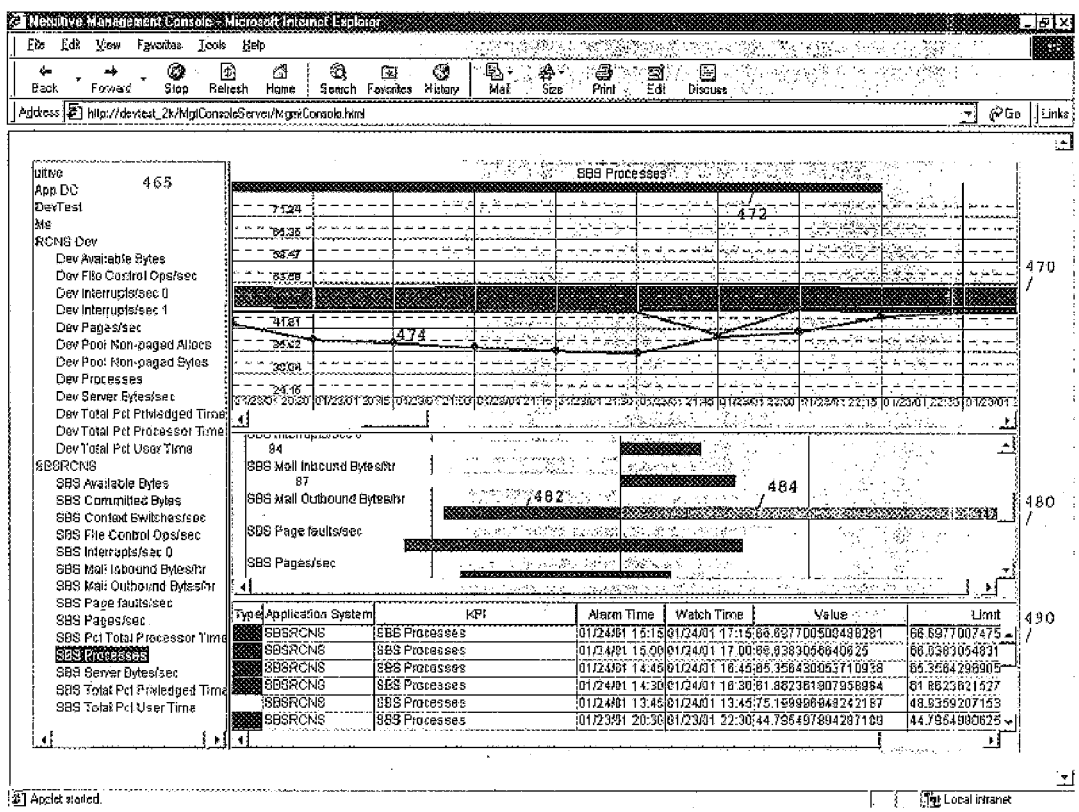
FIG. 4B illustrates an alternative embodiment of screen of FIG. 4A that also uses a multi-window, browser-based screen.

FIG. 4B illustrates an alternative embodiment of screen 405 that uses a multi-window, browser-based screen 460. This screen includes a control window 465 that enables hierarchical viewing of each system and associated indicators. While the screen 405 only illustrated key performance indicators in the control window 425, the control window 465 includes both key performance indicators and underlying indicators.

In addition, the screen 460 includes a summation window 470 that graphically displays the "Baseline," actual performance and predicted performance for any given indicator. The summation window 470 performs substantially similar to the KPI window 430. However, the window 470 uses a blue bar 472 that represents the window in which the predictive alarm was issued and a blue diamond 474 that represents the predicted performance outside the baseline. Alternatively, the window 470 could include a yellow square on the actual performance curve that represents an adaptive alarm. Adaptive alarms indicate unpredicted system performance outside the baseline. Though not shown, the window 470 could also include red hexagons that represent performance outside a user defined thresholds. These user defined thresholds are explained in greater detail with reference to FIGS. 8A and 10. Moreover, the timescale within the window can vary. For example, the window 470 can illustrate the data collected within a day or a week.

The screen 460 also includes an indicator window 480 that illustrates the percentage of the "Baseline" used by indicators within a given instance. Consequently, the window 480 functions similarly to the window 440 illustrated in FIG. 4A. In contrast, the window 480 positions zero percent of the baseline in the center of this window. As a result, the window 480 can illustrate the percentage of indicator usage relative to the top and bottom of the "Baseline." For example, the indicator labeled "SBS Mail Outbound Bytes/hr" uses 47% of the bottom of "Baseline" as indicated by the bar 482. In contrast, this same indicator utilizes 147% of the top of the "Baseline" as indicated by the bar 484. Hence, a system monitor can quickly assess an indicator's performance relative to the "Baseline."

Finally, the screen 460 includes an alarm window 490 that functions similarly to the alarm window 450 described with reference to FIG. 4A. However, the alarm window 490 identifies the application system and performance indicator associated with each alarm. This window 490 also illustrates adaptive alarms as yellow squares, predictive alarms as blue squares, and user-specified alarms as red squares in the column labeled "Type." Consequently, a system manager can easily identify the application system that is malfunctioning.

Figure 8A:
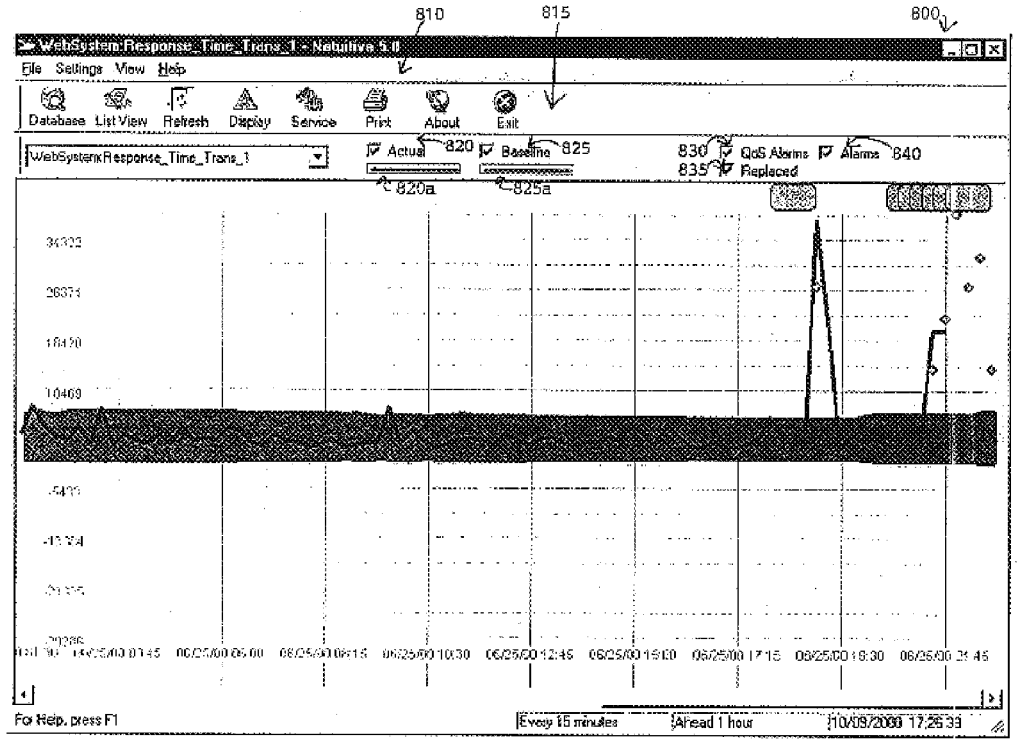
FIG. 8A is a Windows-based screen generated by the reporting user interface of FIG. 1 that illustrates the actual and predicted network performance.

Turning to FIG. 8A, this figure illustrates a Windows-based screen 800 generated by the reporting user interface 130 that graphically illustrates actual and predicted performance of the computer system 110. This screen includes a main toolbar 810 with various legends such as "File," "Settings," "View," and "Help." In the preferred embodiment, the main toolbar 810 provides for navigation and selectivity via drop-down menu lists through the application, which is well known in the art. The windows-based screen 800 further includes a secondary toolbar 815 having the legends "Database," "List View," "Refresh," "Display," "Service," "Print," "About," and "Exit." In the exemplary embodiment, the legends are displayed in combination with associated icons representative of such legends. Generally, the legends on the secondary toolbar 815 allow tailoring by the user. For example, selecting List View icon may cause the reporting user interface 130 to generate the graphical information in a list format. In addition, the service icon allows the user to stop the forecasting process or specify which database should be used during forecasting.

Figure 8B:
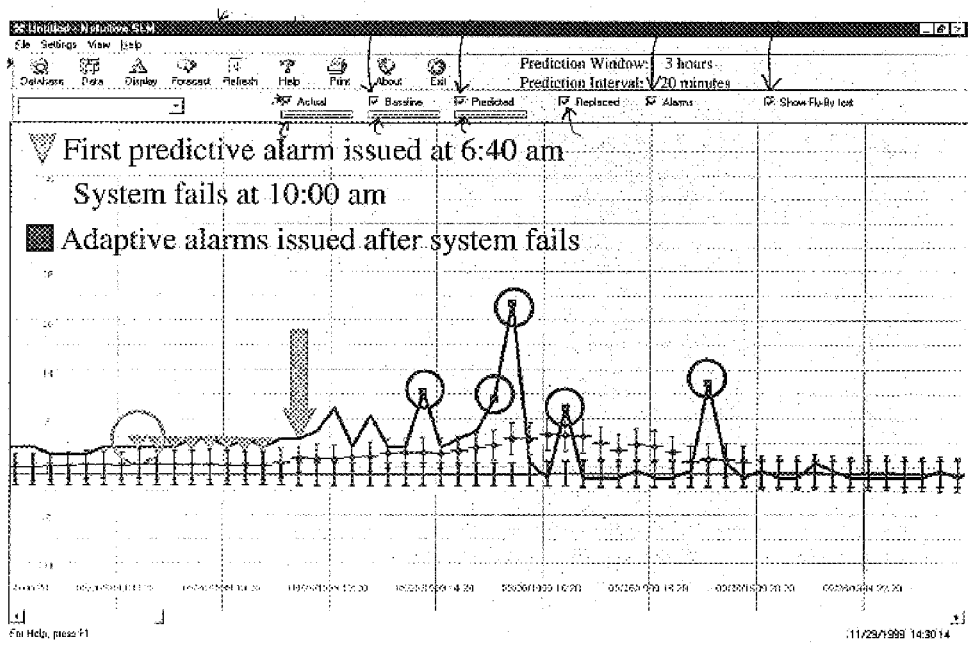
FIG. 8B is an alternative embodiment of the screen of FIG. 8A.

The screen 800 may provide for end-user tailoring of the displayed graphical information. For example, there is a selection box 820, labeled "Actual," for displaying the actual performance graphically; a selection box 825, labeled "Baseline," for displaying baseline performance graphically; a selection box 830 labeled "QoS Alarms," for allowing the user to define alarm thresholds; a selection box 835, labeled "Replaced," for replacing non-existent or corrupted values with estimated values; a selection box 840, labeled "Alarms," for displaying alarms on the graphical information. The QoS alarms may be illustrated on the graphical information as hexagons and/or be distinguished by color. Associated with "Actual," and "Baseline," there are associated viewer boxes 820a and 825a. Within each of these associated viewer boxes there is a colored line representing the color selected for rapidly correlating visually a color or the like with the respective graphical information. The graphical illustration in screen 800 could be the same as the graphical illustration in window 430, or the alarms, Baseline and system performance could be illustrated as shown in FIG. 8B. Another alternative embodiment may include a multi-window, Windows-based screen that resembles the screen 405.

Figure 9A:
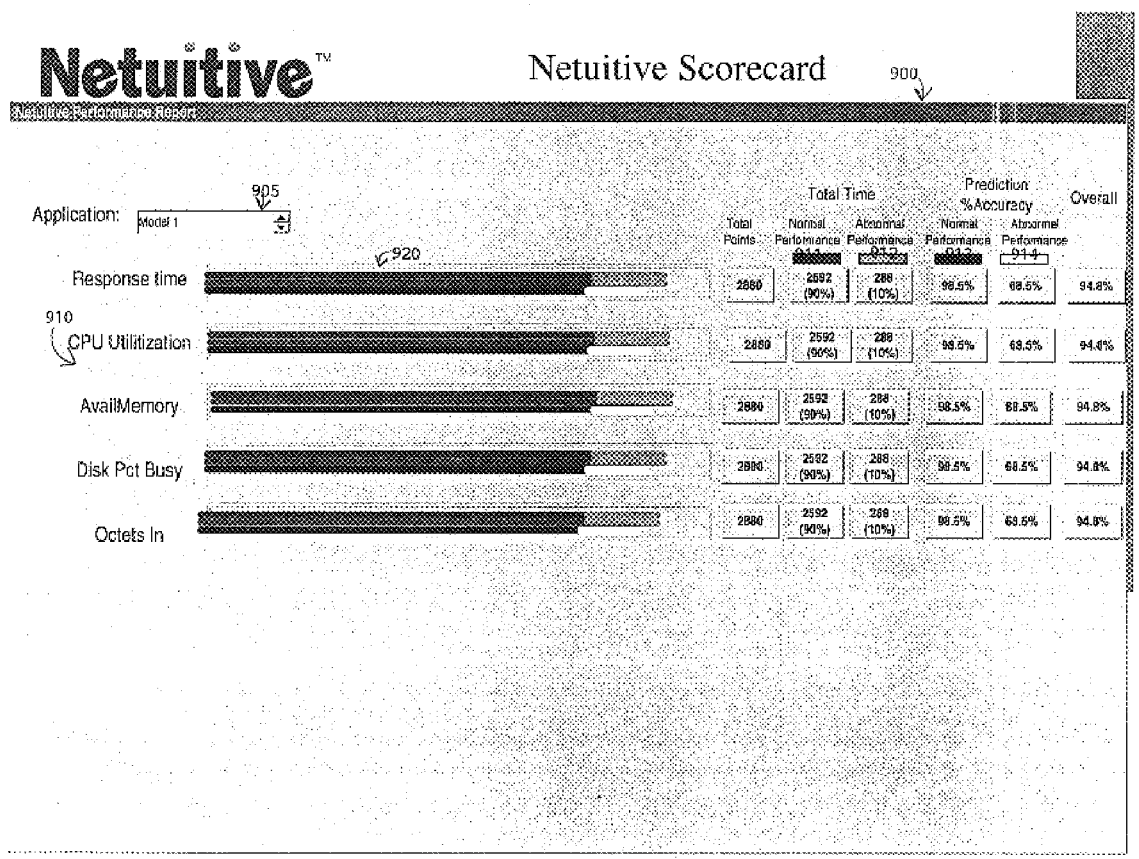
FIG. 9A is a graphical comparison of normal system performance to abnormal system performance and the related prediction accuracy.

In any of the above-mentioned embodiments, the reporting user interface 130 may further include a performance report screen 900 that graphically compares normal system performance to abnormal system performance for an e-business 150 as illustrated in FIG. 9A. This screen may be accessed via menu selectivity or from the management console illustrated with screen 405. The performance report screen 900 includes a selection box 905 with a label "Application," that associates an application system with the displayed information in screen 900. The performance report screen 900 also includes various graphical representations 910 having labels "Response time," "CPU Utilization," "AvailMemory," "Disk Pct Busy," and "Octets In," that illustrate the behavior of the corresponding key performance indicator (KPI).

Associated with "Total Time Normal Performance," "Total Time Abnormal Performance," "% Accuracy of predicting normal performance," "% Accuracy of Predicting abnormal performance", there are associated viewer boxes 911, 912, 913, and 914. Within each of the associated viewer boxes there is a colored line representing the color selected for rapidly correlating visually a color or the like with the respective graphical information. For example, a user may quickly assess that the response time KPI performed normally and was predicted accurately most of the time by viewing the bars 920. As a further enhancement, the performance report screen 900 includes columnar numeric values having labels "Total Points," "Total Time Normal Performance," "Total Time Abnormal Performance," "% Accuracy of predicting normal performance," "% Accuracy of predicting abnormal performance," and "% Accuracy overall." Consequently, users may view performance information both graphically and numerically.

Figure 9B:
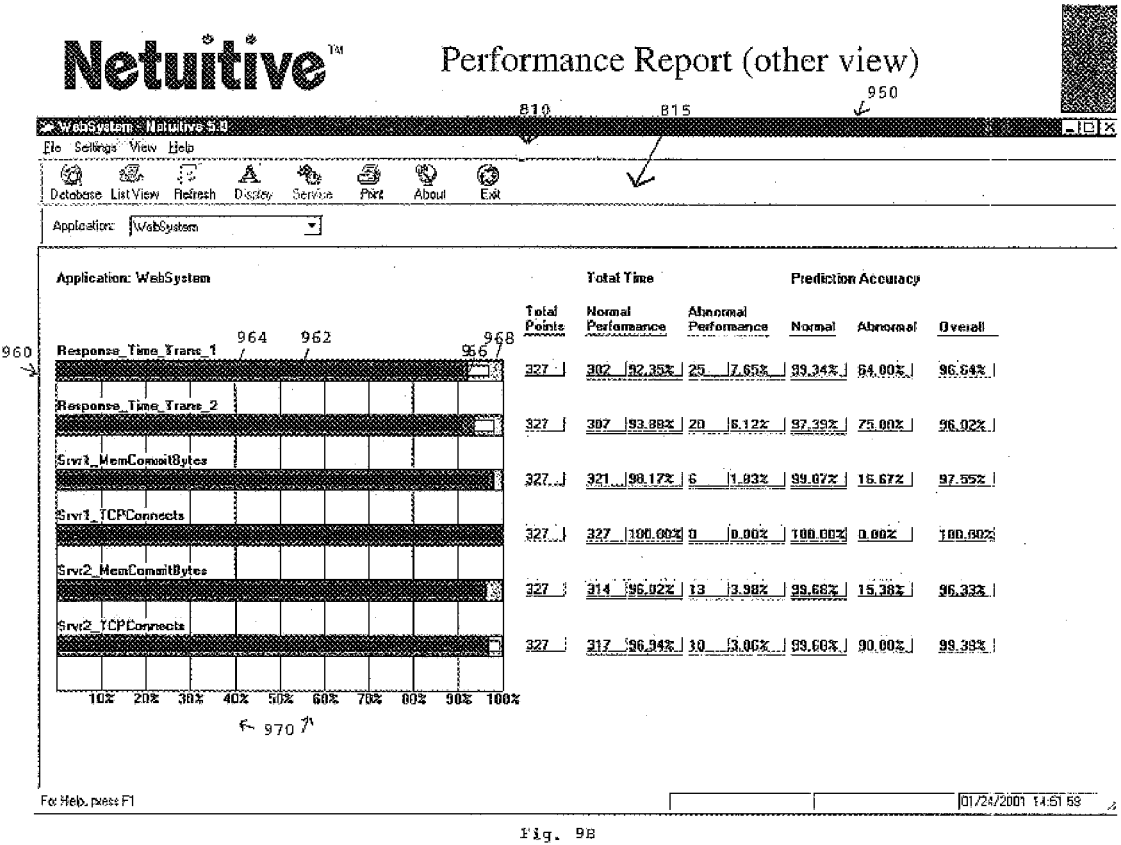
FIG. 9B is an alternative embodiment of FIG. 9A that illustrates a Windows based performance report screen.

FIG. 9B is an alternative embodiment of the screen 900 that illustrates a Windows based performance report screen 950. This screen includes a primary toolbar 810 and a secondary toolbar 815 as described in reference to FIG. 8A. Moreover, the screen 950 functions substantially similar to the screen 900 and uses the same color scheme. However, the screen 950 uses superimposed bars 960 as the graphical representations. For example, the blue bar 962 predicts normal performance. The green bar 964 represents normal performance. Likewise, the yellow bar 966 predicts abnormal system performance, which is represented by the red bar 968. Superimposing these bars enables a better visual comparison of the prediction accuracy. Besides the superimposed bars, the screen 950 also includes a performance scale 970 that gives an idea of the general performance.

Figure 10:
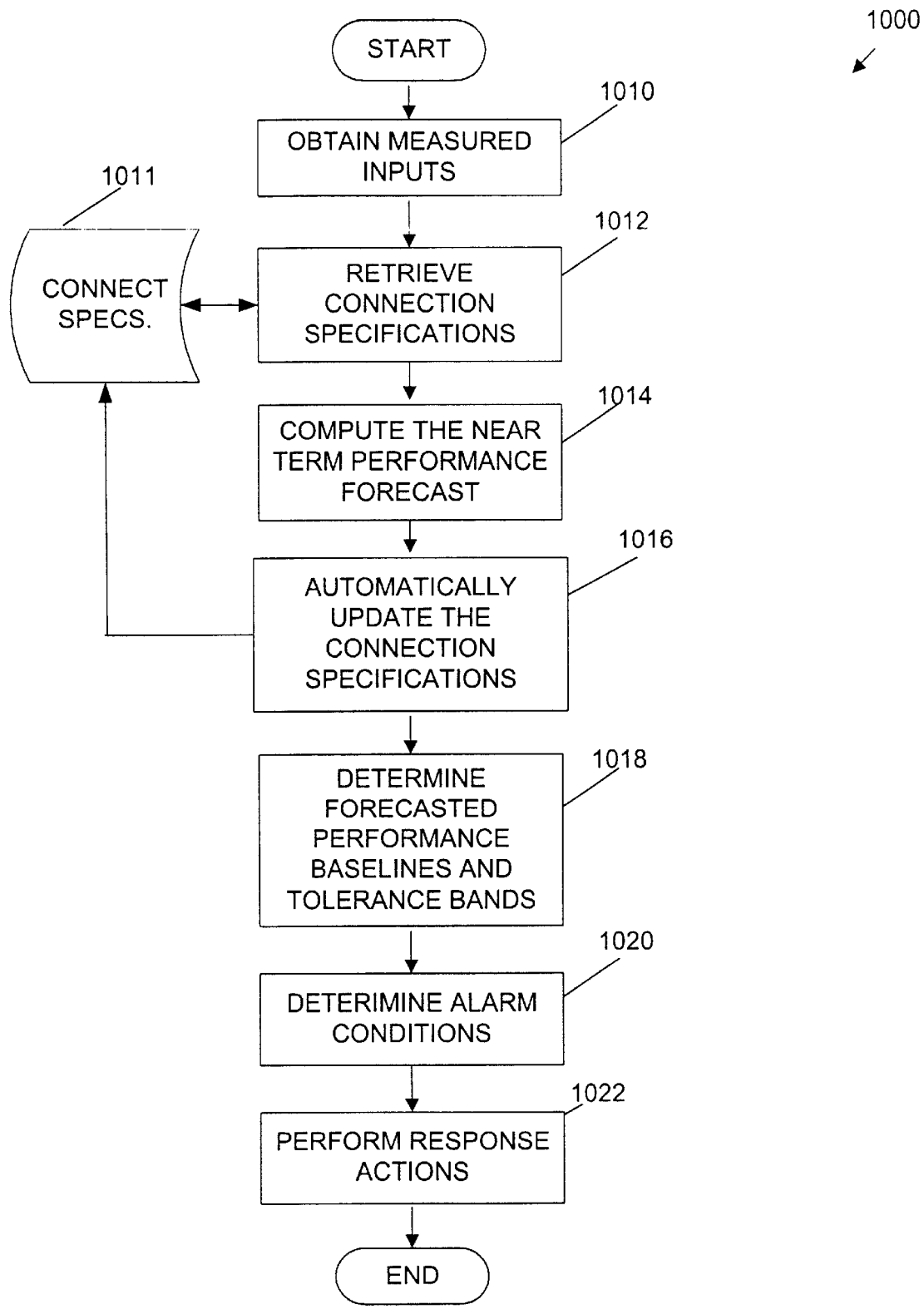
FIG. 10 is a logic flow diagram illustrating a method for forecasting the performance of a computer system or computer network.

FIG. 10 is a logic flow diagram illustrating a routine 1000 for forecasting the performance of a computer system or computer network. The near-term computer performance forecasting system 110 typically repeats routine 1000 for each of a series of sequential time trials, such as every five minutes, ten minutes, fifteen minutes, twenty minutes, thirty minutes or sixty minutes or any combination thereof. At step 1010, the system 110 obtains a vector of input values. As noted previously, these input values may include intrinsic measured values as well as extrinsic values. The measured input values are typically representative of activity associated with the computer system's components or subsystems for the current time interval. The measured input values may be obtained by polling of the monitoring agents 210, 212, and 214 or polling of the internal data sources 151 directly. In the preferred embodiment, the external data sources 152 are also polled for the external input values.

Step 1010 is followed by step 1012, in which the system 110 retrieves the connection specifications, or learned parameters, from the connection specification database. The connection specifications define the mathematical relationships for computing the near-term performance forecast, or output values that are used to compute the near-term performance forecast, based on the measured input values. Step 1012 is followed by step 1014, in which the system 110 computes the near-term performance forecast for the computer system or e-business system 150 based on the measured input values and the connection specifications. Step 1014 is followed by step 1016, in which the system 110 automatically updates the connection specifications in the connection specification database 111 based on the measured input values for the current time interval. The connection specifications preferably include connection weights defining elements of an inverse covariance matrix that can be updated directly. Alternatively, step 1016 may include automatically updating the connection weights in a covariance matrix corresponding to the inverse covariance matrix; and then inverting the updated covariance matrix. In addition, step 1011 represents interaction with the connection specification database, as fully described in the incorporated references.

Figure 11:
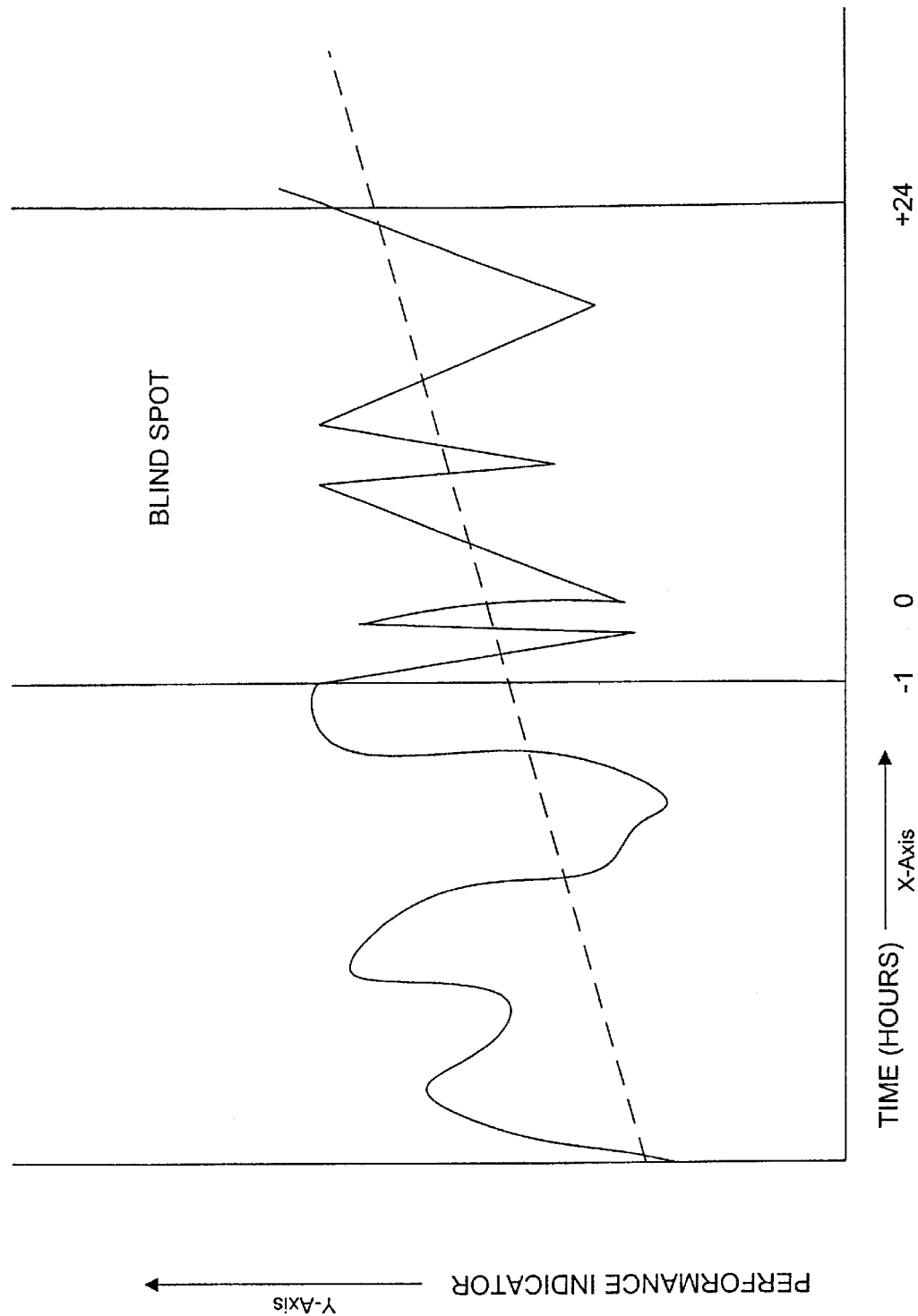
FIG. 11 illustrates an exemplary graphical representation of the e-business blind spot.

Step 1016 is followed by step 1018, in which the forecasted performance ("Predicted") and tolerance bands are determined for the computer system of the e-business system 150 for a plurality of near-term forecasted intervals. The forecasted performance ("Predicted") and tolerance bands are compared with the "Baselines" with tolerance bands of the e-business system 150 and the "Actual" performance of the e-business system 150. The forecasted ("Predicted") performance with tolerance bands, the "Baseline" with tolerance bands and the "Actual" performance are adapted to be displayed as described above in relation to FIGS. 4, 8A and 8B. In the preferred embodiment, the forecasted performance may be for the "blind spot" between −1−+24 hours. Moreover, the dashboard 335 would identify alarms within the "blind spot" of FIG. 11.

Step 1018 is followed by step 1020, in which at least one alarm condition may be determined. An alarm condition is based on forecasted ("Predicted") performance of one or more of the data sources 151, 152 or subsystems which will have an impending status outside of prescribed or normal operating conditions. The alarm condition is typically displayed on the dashboard 335 by the red illumination of one of the plurality of status light indicators 337. The at least one alarm condition is displayed on the dashboard 335 and indicated graphically via the reporting user interface 130.

In determining an alarm condition, the forecasting routine 1000 may also consider user specified criteria entered into the reporting user interface 130. For example, the reporting user interface 130 may include a selection under the "Tools" pull down menu that allows a user to set custom alarms. When setting custom alarms, the user may specify the type of action that would trigger an alarm. For example, a user may indicate that an alarm should be sent when the error detection and correction module 117 imputes estimated values for erroneous or missing input values. When this user-specified criterion is satisfied, the forecasting routine 1000 determines an alarm condition as described above.

In addition to imputation, the forecasting routine 100 may consider other types of user specified alarm criteria. For example, a user could specify system performance thresholds. If the system performance exceeds these thresholds, the forecast routine 1000 could issue a "QoS" alarm as previously described with reference to FIG. 8A. A user can specify values of the learned parameters that should result in the generation of an alarm. Hence, the forecasting routine 1000 can determine an alarm in step 1020 for any of the above-stated user-specified criteria. Thus, the forecasting routine 1000 allows variable programmable alarming in that a customer can alarm most system related issues.

Step 1020 is followed by step 1022, in which the system 110 performs one or more response actions, such as reallocating communication trunk capacity to meet a projected shortfall, reallocating server or memory capacity to a particular application, ending or postponing non-critical tasks, discontinue service to interruptable customers, or other corrective actions. Like step 1020, the forecasting routine may also consider user specified response actions in step 1022 entered using the reporting user interface 130. For example, the forecasting routine 1000 may log the day and time each time it issued an alarm for imputing input values in step 1022. By periodically reviewing this log, a user may assess the reliability of the data used in forecasting.

While the flowchart of FIG. 10 illustrates the steps for forecasting the performance of the e-business system 150, the flowchart of FIG. 10 can also be used to forecast the performance of an individual data source or subsystem thereof, such as shown in FIG. 4A.

The near-term forecasting of the present invention makes it possible to allow an e-business system 150 to lease part of their infrastructure based on low usage times. In the preferred embodiment, the near-term forecasting of the present invention may identify or predict low usage time so the advertisement scheduling may be optimized for maximizing revenue. In view of the foregoing, it will be appreciated that the accurate computer system near-term performance forecast computed by the present invention provides many advantages over prior monitoring agents and other network management tools. It should be understood that the foregoing relates only to the exemplary embodiments of the present invention, and that numerous changes may be made to these embodiments without departing from the spirit and scope of the invention as defined by the following claims.

The invention claimed is:

1. A method for computing a performance forecast for a computer system including a plurality of components comprising the steps of, for each of a plurality of successive time intervals:

obtaining input values correlated to activity associated with the components;

retrieving learned parameters defining mathematical relationships for computing the performance forecast based on the measured input values;

computing a performance forecast for the computer system based on the input values and the connection specifications; and automatically updating the learned parameters based on the input values.

2. The method of claim 1, further comprising the steps of:

determining a tolerance band for the performance of the computer system for a plurality of near-term time intervals;

determining whether the performance forecast for the computer system falls outside the tolerance band; and automatically implementing one or more response actions if the performance forecast for the computer system falls outside the tolerance band.

3. The method of claim 2, wherein the response actions are selected from the group including activating an alarm condition, imputing missing or deviant input values, reallocating communication resources, reallocating processing resources, changing system configuration settings, discontinuing non-critical system functions, restarting an application, and changing an advertising program.

4. The method of claim 3, wherein activating an alarm condition includes activating an alarm condition in response to a user-specified alarm criterion.

5. The method of claim 4, wherein the user-specified alarm criterion is selected from the group including a user defined performance threshold and imputing input values.

6. The method of claim 3, further comprising the step of automatically implementing one or more of the response actions in response to a forecasted system slowdown or failure.

7. The method of claim 1, wherein the step of obtaining the input values includes the step of communicating with one or more computer system monitoring agents to obtain measured input values representative of performance of the components of the computer system.

8. The method of claim 7, wherein the step of obtaining the measured input values includes the step of pinging the computer system to obtain a measured response time.

9. The method of claim 7, further comprising the steps of:
displaying indicators representative of the input values;
displaying indicators representative of the components; and
displaying at least one status representative of the performance forecast for the computer system.

10. The method of claim 9, wherein the components indicators represent the response time at a web server, the response time at an application server, and the response time at a database server.

11. The method of claim 10, wherein the step of obtaining input values includes the steps of:
receiving a first measured input value representative of response time at a web server from a first monitoring agent;
receiving a second measured input value representative of response time at an applications server from a second monitoring agent; and
receiving a third measured input value representative of response time at a database server from a third monitoring agent.

12. The method of claim 11, wherein the step of obtaining input values includes the step of communicating with data sources external to the computer system for external input values.

13. The method of claim 12, wherein the external input values are representative of demographic factors selected from the group including time, date, season, advertising scheduling, methodology of advertising; telephone traffic; day, week, year, holiday, weather, news, sports events, and television programming.

14. The method of claim 1, wherein:
the learned parameters include connection weights defining elements of an inverse covariance matrix; and
the step automatically updating the learned parameters includes the steps of automatically updating the connection weights in a covariance matrix corresponding to the inverse covariance matrix, and inverting the updated covariance matrix.

15. The method of claim 1, wherein:
the learned parameters include connection weights defining elements of an inverse covariance matrix; and
the method step of automatically updating the learned parameters comprises the step of automatically updating the connection weights of the inverted covariance matrix.

16. A computer storage medium, or a group of computer storage media, comprising computer-executable instructions for performing the method of claim 1.

17. A method of computing a performance forecast for a computer system including a plurality of components, comprising the steps of, for each of a plurality of successive time intervals:
obtaining one or more input values for a current time interval;
retrieving learned parameters defining mathematical relationships for computing the performance forecast based on the measured input values;
computing the performance forecast for the computer system based on the measured input values and the learned parameters;
automatically updating the learned parameters based on the measured input values for the current time interval;
determining a tolerance band for the performance of the computer system for a plurality of time intervals;
determining whether the performance forecast for the computer system falls outside the tolerance band; and
taking one or more response actions in response to the performance forecasted for the computer system selected from the group including activating an alarm condition, imputing missing or deviant input values, reallocating communication resources, reallocating processing resources, restarting an application, changing system configuration settings, discontinuing non-critical system functions, and changing an advertising program.

18. The method of claim 17, wherein one or more of the input values are representative of measured response times for internal components of the computer system selected from the group including a web server, an application server, and a database server.

19. The method of claim 18, wherein one or more of the input values are representative of external demographic factors selected from the group including time, date, season, advertising scheduling, methodology of advertising; telephone traffic; day, week, year, holiday, weather, news, sports events, and television programming.

20. A system for monitoring and proactively managing a network-based computer system, comprising:
an error detection and correction module operative to compute an error-corrected input data vector by:
receiving input values for a current time interval,
detecting deviant or missing data values among the measured input values, and
imputing replacement data values to replace the deviant or missing data values;
a concurrent-learning information processor operative to:
receive the error-corrected input data vector for the current time interval,
retrieve a set of learned parameters representing observed relationships among the measured input values and a set of output values,
compute the set of output values based on the error-corrected input data vector and the learned parameters, and
update the learned parameters based on the measured input values for the current time interval; and
a reporting user interface operative to:
compute a performance forecast for the computer system based on the set of output values for the current time interval, compare the performance forecast to a tolerance band, and take one or more response actions in response to the performance forecast selected from the group including activating an alarm condition, imputing a missing or deviant input value, reallocating communication resources, reallocating processing resources, changing system configuration settings, discontinuing non-critical system functions, restarting an application, and changing an advertising program.

21. The system of claim 20, wherein one or more of the input values are representative of measured response times for internal components of the computer system selected from the group including a web server, an application server, and a database server.

22. The system of claim 20, wherein one or more of the input values are representative of external demographic factors selected from the group including time, date, season, advertising scheduling, methodology of advertising; telephone traffic; day, week, year, holiday, weather, news, sports events, and television programming.

23. A user interface for displaying a performance forecast for a computer system, the user interface comprising:

a control window for providing hierarchical viewing of a plurality of application systems and subsystems for the computer system, the control window enabling selection of any one of the plurality of application systems and subsystems;

a plurality of independently operable windows for displaying detailed information regarding the performance of the application systems and subsystems; wherein the selection of an application system or subsystem in the control window modifies information displayed in the plurality of windows.

24. The user interface of claim 23 wherein the plurality of windows further comprises:

a summation window for graphically displaying the forecasted performance of the computer system, actual performance of the computer system and a tolerance band for the performance of the computer system;

a threshold window for displaying the percentage of the tolerance band utilized by at least one application subsystem;

an alarm window for displaying alarm information associated with the performance forecast for each application system and subsystem; wherein the selection of an application system or subsystem in the control window modifies information displayed in the summation window, the threshold window, and the alarm window.

25. The user interface of claim 23 wherein a method for computing the performance forecast for the computer system includes a plurality of components comprising the steps of, for each of a plurality of successive time intervals:

obtaining input values correlated to activity associated with the components;

retrieving learned parameters defining mathematical relationships for computing the performance forecast based on the measured input values;

computing a performance forecast for the computer system based on the input values and the connection specifications; and automatically updating the learned parameters based on the input values.

* * * * *